United States Patent
Pedersen (10) Patent No.: US 8,222,861 B1
(45) Date of Patent: Jul. 17, 2012

(54) ELIMINATION OF POWER CONSUMPTION WHEN CHARGER/ADAPTOR IS NOT IN USE

(75) Inventor: Richard N. Pedersen, Toms River, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 346 days.

(21) Appl. No.: 12/701,700

(22) Filed: Feb. 8, 2010

(51) Int. Cl.
*H02J 7/00* (2006.01)
(52) U.S. Cl. ........................................ 320/108; 320/107
(58) Field of Classification Search .................. 320/108
See application file for complete search history.

(56) References Cited

U.S. PATENT DOCUMENTS

| 3,802,159 | A | * | 4/1974 | Ferdelman | 96/82 |
| 4,383,212 | A | | 5/1983 | Ballman | |
| 6,052,291 | A | | 4/2000 | Suzuki et al. | |
| 6,339,314 | B1 | | 1/2002 | Bruning | |
| 6,498,456 | B2 | * | 12/2002 | Ettes et al. | 320/108 |
| 2003/0184259 | A1 | * | 10/2003 | Yang | 320/107 |
| 2009/0075704 | A1 | * | 3/2009 | Wang | 455/573 |

* cited by examiner

*Primary Examiner* — M'Baye Diao
(74) *Attorney, Agent, or Firm* — Howard IP Law Group, PC (57) ABSTRACT

A plug-and-socket arrangement connects a portable appliance to a mains-powered battery charger/power supply. To avoid unwanted power consumption while the appliance is not connected, the plug-and-socket arrangement, when unplugged so that the appliance can be made portable, disconnects the mains power from the battery charger/power supply.

9 Claims, 2 Drawing Sheets

ELIMINATION OF POWER CONSUMPTION WHEN CHARGER/ADAPTOR IS NOT IN USE

BACKGROUND

There has been an increasing emphasis on reducing power usage generally. This emphasis extends to reducing electrical power usage, as from the alternating-current power mains. The recent introduction of all-electric or electrically-chargeable gas-electric hybrid automobiles has brought into focus the limitations of the power mains.

One of the little-appreciated aspects of power mains consumption lies in the ubiquitous battery-powered accessory charger, which is used to charge battery-operated appliances such as cell phones from the power mains. Many such battery-operated appliances exist, including battery-operated tools such as drills and saws, and personal grooming devices such as battery-powered toothbrushes.

A salient aspect of the use of such chargers for battery-operated appliances is that the appliances are removed from the charger for portable use. Often the charger remains in place and connected to the power mains when the appliance is removed for portable use. The term "connected" or "coupled" as used herein means "electrically connected" unless mechanical connection is clearly set forth.

Many such battery chargers use isolation transformers to protect the user of the charger from any chance of coming into contact with a power main. The transformers also provide an ancillary benefit, in that, by proper selection of the turns ratio of the primary and secondary windings, the secondary-side alternating voltage can be reduced to a range generally commensurate with the voltage of the battery or battery pack of the appliance.

It should be noted that the terms "between," "across," and other terms such as "parallel" have meanings in an electrical context which differ from their meanings in the field of mechanics or in ordinary parlance. More particularly, the term "between" in the context of signal or electrical flow relating to two separate devices, apparatuses or entities does not relate to physical location, but instead refers to the identities of the source and destination of the flow. Thus, flow of signal "between" A and B refers to source and destination, and the flow itself may be by way of a path which is nowhere physically located between the locations of A and B. The term "between" can also define the end points of the electrical field extending "across" or to points of differing voltage or potential, and the electrical conductors making the connection need not necessarily lie physically between the terminals of the source. Similarly, the term "parallel" in an electrical context can mean, for digital signals, the simultaneous generation on separate signal or conductive paths of plural individual signals, which taken together constitute the entire signal. For the case of current, the term "parallel" means that the flow of a current is divided to flow in a plurality of separated conductors, all of which are physically connected together at disparate, spatially separated locations, so that the current travels from one such location to the other by plural paths, which need not be physically parallel.

In addition, discussions of circuits necessarily describe one element at a time, as language is understood in serial time. Consequently, a description of two interconnected elements may describe them as being in "series" or in "parallel," which will be true for the two elements as initially described. However, further description of the circuit may implicate other interconnected devices, which when connected to the first two devices may result in current flows which contradict the "series" or "parallel" description of the original two devices. This is an unfortunate result of the limitations of language, and all descriptions herein should be understood in that context.

SUMMARY

A mains-powered voltage adapter/charger is for powering or charging an appliance defining electrodes by which power or charging current may be applied. The adaptor/charger comprises a housing and a transformer located within the housing. The transformer includes a secondary winding and a primary winding. The primary winding defines first and second electrodes, for generating transformed voltage at the secondary winding when mains power is applied to the first and second electrodes of the primary winding. A voltage conditioner is located within the housing and is electrically coupled to the secondary winding, for generating conditioned voltage in response to the transformed voltage. A mating socket-and-plug arrangement includes at least first, second and third mating contact sets. The socket of the socket-and-plug arrangement is affixed to the housing so that the mating plug can be mated and demated therewith. The first contact of the socket of the socket-and-plug arrangement is connected to the voltage conditioner for receiving the conditioned voltage when the voltage conditioner is supplied with the transformed voltage. The second contact of the socket is connected through the housing to the second electrode of the primary winding, and the third contact of the socket is connected to a mains electrode of the housing by a conductive path extending at least partially through the housing. A conductor interconnects the second and third contacts of the plug of the plug-and-socket arrangement. A conductor extends from the first contact of the plug to one of the electrodes of the appliance, whereby, (a) when the socket and plug are mated, and mains power is applied between the first electrode of the primary winding of the transformer and the mains electrode of the housing, conditioned voltage is applied to the appliance, and (b) when mains power is applied between the first electrode of the primary winding of the transformer and the mains electrode of the housing and the socket and plug are demated, the appliance is rendered physically independent of the housing and the primary winding of the transformer is decoupled from the mains.

An energizing arrangement according to an aspect of the disclosure is for electrically energizing, from power mains, a portable or at least removable electrical appliance. The portable appliance may include a battery that can be charged when the appliance is connected to the energizing arrangement. The appliance includes first and second electrodes by which direct current or direct voltage may be applied for energization. The energizing arrangement comprises one of a socket and a plug. The one of a socket and a plug includes first, second, and third mutually isolated contacts. The other one of a socket and a plug is adapted for physical mating with the one of a socket and a plug. The other one of a socket and a plug includes first, second, and third contacts. The first contact of the other one of the socket and plug is isolated from the second and third contacts of the one of the socket and plug. The third contact of the other one of the socket and plug is electrically common with the second contact of the other one of the socket and plug, and, when the one of the socket and plug is mated with the other one of the socket and plug, the first contact of the one of the socket and plug is connected to the first contact of the other one of the socket and plug, the second contact of the one of a socket and plug is connected to the second contact of the other one of the socket and plug, and the third contact of the other one of the socket and plug is connected to the third contact of the one of the socket and plug. The energizing arrangement includes an energizing or charging current converter, referred to herein as a "charger", which may perform voltage or current regulation, or both as in the case of a foldback regulator. The charger includes first, second, third, and fourth electrodes. The charger is energized when mains power is applied to the first and third electrodes of the charger, and when so energized, produces energizing potential between the fourth and third electrodes of the charger. A first electrical conductor is connected to the third contact of the one of a socket and plug and is adapted to be connected to the power mains. A second electrical conductor is connected to the first electrode of the charger and is adapted to be connected to the power mains. A third electrical conductor is connected to the fourth electrode of the charger and to the first contact of the other one of the socket and plug. A fourth electrical conductor is connected to the first contact of the other one of the socket and plug and to the first electrode of the appliance. A fifth electrical conductor is connected to at least one of the second and third contacts of the other one of the socket and plug and to the second electrode of the appliance. A sixth electrical conductor is connected to the third electrode of the charger and to the second contact of the one of the socket and plug. A seventh electrical conductor connects the second and third contacts of the other one of the socket and plug. As a result, when the socket and plug are mated the second and third electrodes of the charger are connected and the charger is energized, the first contact of the other one of the socket and plug is electrically connected to the first direct-current electrode of the appliance, and at least one of the second and third contacts of the other one of the socket and plug is electrically connected to the second direct-current electrode of the appliance, and the charger applies energizing or charging voltage to the appliance. When the other one of the socket and plug is not mated with the one of the socket and plug, the second and third electrodes of the charger are disconnected and the charger draws no current from the mains.

A charger or power source is for use with an appliance, where the appliance is energized or charged by application of conditioned voltage across first and second electrodes. The charger or power source comprises a housing containing a transformer. The transformer includes a primary winding defining first and second electrodes, for generating secondary power when the first and second electrodes of the transformer are energized from alternating-current power mains. The housing also includes at least one contact adapted to be connected to one side of the power mains. The housing also includes a socket of a plug-and-socket arrangement. The socket includes at least first, second, and third contacts. The second contact of the socket is connected to the second electrode of the primary winding of the transformer, the third contact of the socket is connected to the one contact of the housing whereby, when the one contact is connected to the one side of the power mains and the first electrode of the primary winding of the transformer is connected to the other side of the power mains, the one side of the power mains is also connected to the third contact of the socket and the transformer is energized. The housing also containing a power conditioner coupled to a secondary winding of the transformer, for, when the transformer is energized, generating the conditioned voltage and applying the conditioned voltage to the first contact of the socket. The charger or power source also includes a plug of the plug-and-socket arrangement. The plug includes at least first, second, and third contacts, which first, second, and third contacts mate with the first, second, and third contacts of the socket, respectively, when the plug-and-socket are mated. The first contact of the plug is connected to the first electrode of the appliance. The second contact of the plug is connected to the third contact of the plug, whereby, when the socket and plug are mated, the one side of the power mains is connected to the second electrode of the primary winding of the transformer, for generating and applying the conditioned voltage to the appliance. In one embodiment of this disclosure, the conditioner generates the conditioned voltage between the first and second contacts of the socket, and the second contact of the plug is connected to the second electrode of the appliance. In another embodiment of the disclosure, the socket comprises a fourth contact, the plug comprises a mating fourth contact, the conditioner generates the conditioned voltage between the first and fourth contacts of the socket, and the fourth contact of the plug is connected to the second electrode of the appliance.

An energizing arrangement according to an aspect of the disclosure is for electrically energizing, from power mains, a portable or at least removable electrical appliance. The portable appliance may include a battery that can be charged when the appliance is connected to the energizing arrangement. The appliance includes first and second electrodes by which direct current or direct voltage may be applied for energization. In this context, the term "electrode" refers to a point on an electrical conductor, and has the same general meaning as "terminal," "node," or "contact." The energizing arrangement comprises one of a socket and a plug. The one of a socket and a plug includes first, second, and third mutually isolated contacts. The other one of a socket and a plug is adapted for physical mating with the one of a socket and a plug. The other one of a socket and a plug includes first, second, and third contacts. The first contact of the other one of the socket and plug is isolated from the second and third contacts of the one of the socket and plug. The third contact of the other one of the socket and plug is electrically common with the second contact of the other one of the socket and plug, and, when the one of the socket and plug is mated with the other one of the socket and plug, the first contact of the one of the socket and plug is connected to the first contact of the other one of the socket and plug, the second contact of the one of a socket and plug is connected to the second contact of the other one of the socket and plug, and the third contact of the other one of the socket and plug are connected to the third contact of the one of the socket and plug. The energizing arrangement includes an energizing or charging current converter, which may perform voltage or current regulation, or both as in the case of a foldback regulator. The converter includes first, second, third, and fourth electrodes. The converter is energized when mains power is applied to the first and third electrodes of the converter, and when so energized, produces energizing potential between the fourth and third electrodes of the converter. A first electrical conductor is connected to the third contact of the one of a socket and plug and is adapted to be connected to the power mains. A second electrical conductor is connected to the first electrode of the converter and is adapted to be connected to the power mains. A third electrical conductor is connected to the fourth electrode of the converter and to the first contact of the other one of the socket and plug. A fourth electrical conductor is connected to the first contact of the one of the socket and plug and to the first electrode of the appliance. A fifth electrical conductor is connected to at least one of the second and third contacts of the other one of the socket and plug and to the second electrode of the appliance. A sixth electrical conductor is connected to the third electrode of the converter and to the second contact of the one of the socket and plug. As a result, when the socket and plug are mated the second and third electrodes of the converter are connected and the converter is energized, the first contact of the other one of the socket and plug is electrically connected to the first direct-current electrode of the appliance, and at least one of the second and third contacts of the other one of the socket and plug is electrically connected to the second direct-current electrode of the appliance. The converter applies energizing or charging voltage to the appliance, and when the other one of the socket and plug is not mated with the one of the socket and plug the converter draws no current from the mains.

An energizing arrangement according to another aspect of the disclosure is for electrically energizing from power mains a removable electrical appliance, where the appliance has first and second electrodes by which direct current may be applied for energization. The energization may result in the charging of a battery of the appliance. The energizing arrangement comprises one of a socket and a plug. The one of a socket and a plug includes first, second, third, and fourth mutually isolated contacts. The other one of a socket and a plug is adapted for physical mating with the one of a socket and a plug. The other one of a socket and a plug includes first, second, third, and fourth contacts. The third contact of the other one of the socket and plug is electrically common with the second contact of the other one of the socket and plug, and, when the one of the socket and plug is mated with the other one of the socket and plug, the first contact of the one of the socket and plug is connected to the first contact of the other one of the socket and plug, the second contact of the one of a socket and plug is connected to the second contact of the other one of the socket and plug, the second and third contacts of the other one of the socket and plug are connected to the third contact of the one of the socket and plug, and the fourth contact of the one of the socket and plug is connected to the fourth contact of the other one of the socket and plug. A converter includes first, second, third, fourth, and fifth electrodes. The converter is energized when mains power is applied to the first and third electrodes of the converter, and when so energized, produces energizing potential between the fourth and fifth electrodes of the converter. A first electrical conductor is connected to the third contact of the one of a socket and plug and is adapted to be connected to the power mains. A second electrical conductor is connected to the first electrode of the converter and is adapted to be connected to the power mains. A third electrical conductor is connected to the fourth electrode of the converter and to the first contact of the one of the socket and plug. A fourth electrical conductor is connected to the fifth electrode of the converter and to the fourth contact of the one of the socket and plug. A fifth electrical conductor is connected to the first contact of the other one of the socket and plug and to the first electrode of the appliance. A sixth electrical conductor is connected to the fourth contact of the other one of the socket and plug and to the second electrode of the appliance. A seventh electrical conductor is connected to the third electrode of the converter and to the second contact of the one of the socket and plug, whereby, when the socket and plug are mated the second and third electrodes of the converter are connected and the converter is energized, the first contact of the other one of the socket and plug is electrically connected to the first direct-current electrode of the appliance, and the fourth contact of the other one of the socket and plug is electrically connected to the second direct-current electrode of the appliance, and the converter applies energizing voltage to the appliance. When the other one of the socket and plug is not mated with the one of the socket and plug the converter draws no current from the mains.

DETAILED DESCRIPTION

Magnetic transformers such as those used for charging the batteries of portable appliances (or alternatively for powering the portable appliance while it is docked) exhibit various losses. For example, the primary side of the transformer windings may exhibit an alternating current component during charging which represents the power transferred to the secondary side of the winding. The primary winding also exhibits stray inductance, which provides a path other than the primary winding through which alternating mains current can leak. Magnetizing current is the term applied to the primary current required to generate and maintain an alternating secondary voltage in the absence of a load on the secondary winding. That is, the magnetizing current is required in order to provide transformer action.

The leakage and magnetizing currents are not large. It has been noted, however, that the cumulative effect of large numbers of battery chargers distributed over the power mains may represent a large power loss.

According to an aspect of the disclosure, a battery charger or energizer is connected to the appliance to be charged or energized by a plug-and-socket arrangement which mechanically disconnects at least one side of the primary winding of the transformer from the power mains when the appliance is disconnected from the charger.

Figure 1:
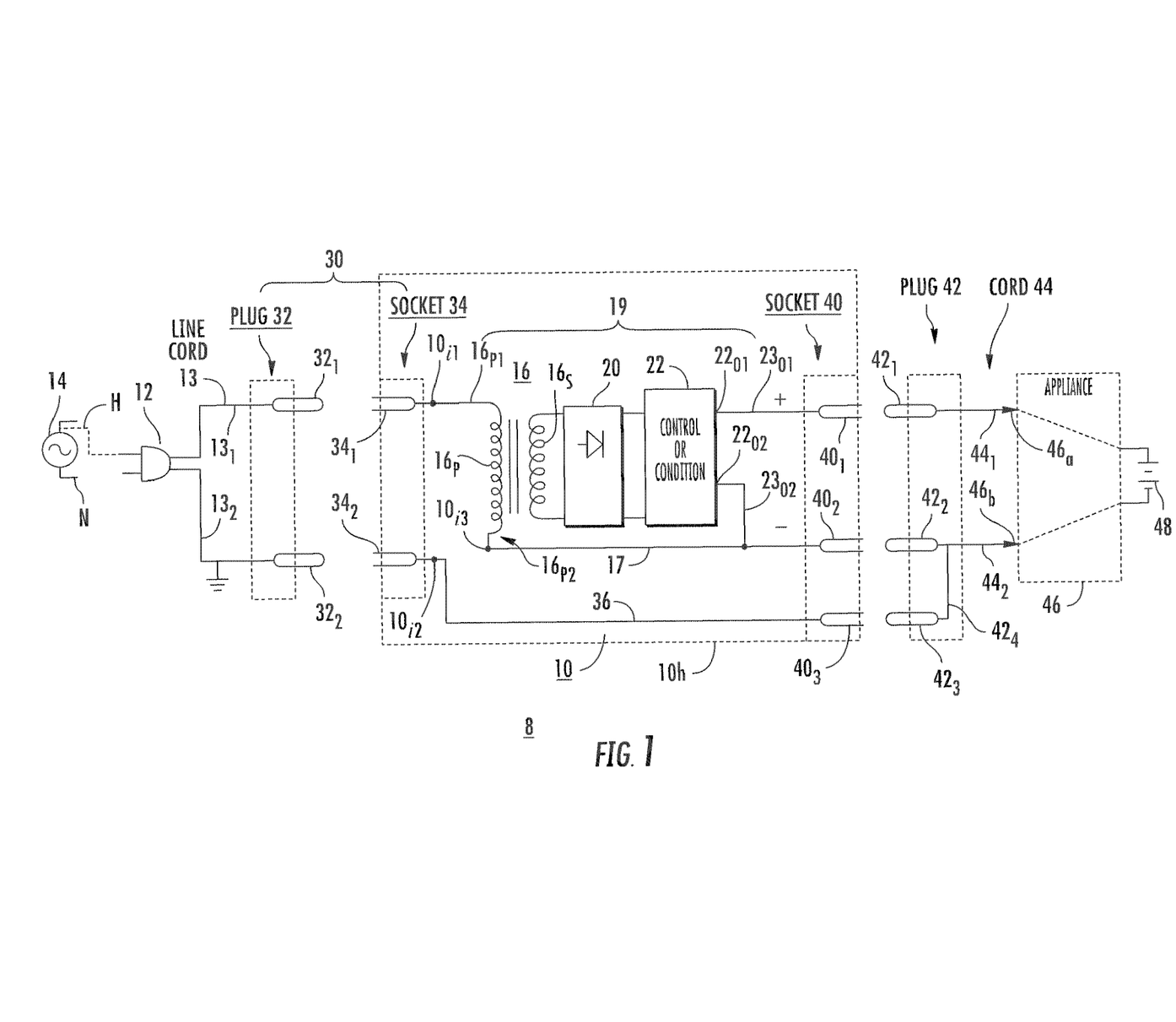
FIG. 1 is a simplified diagram in block and schematic form of a first embodiment.

FIG. 1 is a simplified diagram in block and schematic form illustrating a combination of an energizing arrangement 8 including a powering arrangement or charger 10 according to an aspect of the disclosure, including a housing 10$h$ connected or connectible by a polarized power plug 12 to the alternating-power mains 14. Power-arrangement/charger 10 is also connected or connectible by way of a socket 40, plug 42, and conductive path 44 to an appliance 46 to be powered or energized. A battery symbol 48 represents a battery which may be used in appliance 46 for portable applications.

In FIG. 1, the charger 10 includes an isolation transformer 16 having a primary winding 16$p$ and a secondary winding 16$s$. The electrodes or connections of primary winding 16$p$ are designated 16$p$1 and 16$p$2, respectively. The secondary winding 16$s$ is connected to a voltage conditioner 19 illustrated as including a rectifier arrangement illustrated as a block 20 and a voltage conditioning or converting circuit illustrated as a block 22. Rectifier block 20 generates direct voltage for application to voltage conditioning or converting circuit 22. Voltage conditioning block 22 may include a voltage or current regulator, or both, as in the case of a foldback regulator. It may include a surge arrester, or in some cases it may simply convey power if conditioning is not required. The output direct voltage from conditioner 22 is represented by + and − αsymbols at electrical conductors 23$o$1 and 23$o$2. Those skilled in the art know that the + and − polarizations may be the opposite of that illustrated. As illustrated, conductor 23$o$2 is connected to primary winding conductor 16$p$2 within charger 10 by way of a conductor 17 and a node 10$i$3. Node 10$i$3, and conductors 17 and 23$o$2 are connected to socket element 40$_2$.

In FIG. 1, it is expected that alternating-current (AC) mains voltage will be applied from the mains 14 to AC "input" points 10$i$1 and 10$i$2 of charger 10. Such a connection may be made directly by a polarized power plug 12 and a two-conductor line cord 13, or by polarized power plug 12, two-conductor line cord 13, and a plug-and-socket arrangement 30. Line cord 13 includes first and second conductors 13$_1$ and $13_2$. Conductor $13_2$ is illustrated as being the neutral. Plug-and-socket arrangement 30 includes a two-element plug 32 connected to the conductors $13_1$ and $13_2$ of line cord 13, together with a socket 34. Conductor $13_1$ connects to element $32_1$ which in turn connects to element $34_1$ when 32 and 34 are mated. Likewise, conductor $13_2$ connects to element $32_2$ which in turn connects to element $34_2$ when 32 and 34 are mated. The elements $34_1$ and $34_2$ of socket 34 are connected to AC "input" points $10i1$ and $10i2$, respectively, of charger 10. When plug-and-socket 30 is mated and line plug 12 is connected to the power mains, mains alternating voltage is applied to points $10i1$ and $10i2$. Thus, whether by means of a simple line cord or by a line cord with a plug-and-socket arrangement, power is applied to points $10i1$ and $10i2$. This is not sufficient to energize the charger. It should be noted that while the terms "plug" and "socket" are used to identify certain elements of the structure, it is well known that they may be used interchangeably, and connectors having both plug and socket elements on each mating half are known, so there is no particular significance to be attached to the terms.

In FIG. 1, element $34_2$ of socket 34 is connected to input point $10i_2$, which in turn is connected by way of a conductor 36 to a socket element $40_3$ of "charger output" socket 40. Conductor $23o1$, connected to the + output $22o1$ of the conditioner 22, is connected to a socket element $40_1$ of socket 40. Conductor $23o2$ is connected to the − output $22o2$ of the conditioner 22, and combined or mutually connected conductors $16p2/23o2$ is/are connected to socket element $40_2$. Conductor 36 connects socket element $40_3$ of charger output socket 40 to AC input point $10i_2$. As so far described, in the absence of a connection of appliance plug 42 to charger output socket 40, the charger will not produce charging voltage or current even when AC plug 12 is connected to the mains, because there is no complete circuit to the primary winding $16p$ of transformer 16.

A plug 42 is associated with the appliance 46 to be charged. This association may be a direct mounting or connection of the appliance 46 to the plug 42, or it may be implemented by way of a power cord 44 which includes conductors $44_1$ and $44_2$. Plug 42 includes plug elements $42_1$, $42_2$, and $42_3$. Plug elements $42_1$, $42_2$, and $42_3$ are dimensioned to mate with socket elements $40_1$, $40_2$, and $40_3$, respectively, of charger socket 40, to make electrical connections therewith. Plug element $42_2$ is connected by a conductor $42_4$ to plug element $42_3$. This connection may be made within the appliance plug 42 as illustrated, or alternatively may be made within the appliance 46 if cord 44 is provided with a sufficient number of conductors. Conductor $44_1$ connects element $42_1$ of plug 42 to input $46a$ of appliance 46, and conductor $44_2$ connects element $42_2$ of plug 42 to input $46b$ of appliance 46.

With the connections as illustrated in FIG. 1, with mains AC power applied to points $10i_1$ and $10i_2$, and with plug 42 mated with socket 40, a complete circuit from the mains to the primary winding $16p$ of transformer 16 is made by way of a path including conductor $16p1$, $16p2$, socket element $40_2$, plug element $42_2$, conductor $42_4$, plug element $42_3$, socket element $40_3$, and conductor 36. Thus, when the plug-and-socket arrangement 40/42 is mated, and AC power is applied to (or "across," in electrical jargon) points $10i1$ and $10i2$, primary winding $16p$ is energized to draw current to produce magnetization of the transformer and to supply charging voltage or current to the output of the conditioner 22. The charging voltage or current appears at output ports $22o1$ and $22o2$ and on conductors $23o1$ and $23o2$, respectively, of conditioner 22, and is applied by way of socket elements $40_1$ and $40_2$ of socket 40 to plug elements $42_1$ and $42_2$, respectively, of plug 42, and by conductors $44_1$ and $44_2$, respectively, to power input points of appliance 46. Thus, with alternating-mains power applied to the charger 10 and socket 40 mated with plug 42, conditioned power is applied from charger 10 to appliance 46 to charge the battery 48 or to energize the appliance. Under this operating condition, the magnetizing current of the transformer 16 is necessary to aid in delivering power.

When the appliance 46 being charged (or operated in a docked state) and is removed for portable use, plug 42 is removed from or unmated with socket 40, with the result that plug element $42_3$ is disconnected from socket element $40_3$. This disconnection opens or renders nonconductive the complete path by which the primary winding $16p$ of transformer 16 receives AC energization. In the absence of AC energization, the primary winding $16p$ of transformer 16 cannot draw any current, including magnetizing current, thereby solving the problem by eliminating current drain due to the charger during periods when the appliance being charged or operated is removed from the charger.

Figure 2:
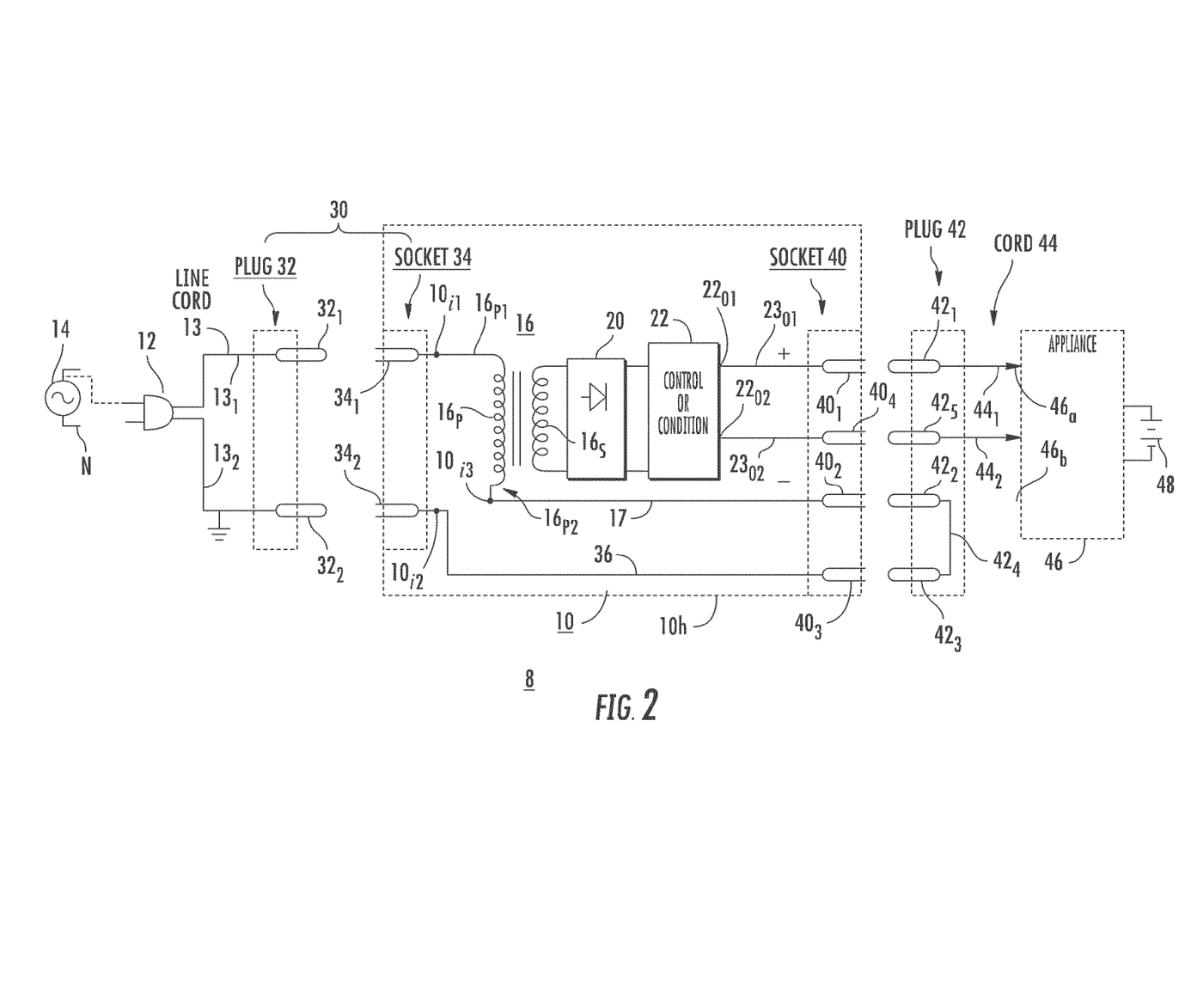
FIG. 2 is a simplified diagram in block and schematic form of a second embodiment.

FIG. 2 is a simplified schematic and block diagram similar to FIG. 1. Elements corresponding to those of FIG. 1 are designated by like reference alphanumerics. The arrangement of FIG. 2 differs from that of FIG. 1 in that the charger socket 40 and its mating plug 42 each have four elements. More particularly, charger socket 40 of FIG. 2 has four socket elements, including $40_1$, $40_2$, and $40_3$ as in the case of FIG. 1. Socket element $40_1$ is connected to conditioner output conductor $22o1$, socket element $40_2$ is connected to transformer conductor $16p2$, and socket element $40_3$ is connected to conductor 36 as in FIG. 1. Socket 40 additionally includes a further socket element $40_4$, which is connected to conditioned power return path $23o2$. Similarly, plug 42 has plug element $42_1$ connected by way of path $44_1$ to a power input portion of the appliance 46. As in the case of FIG. 1, plug $42_1$ mates with socket element $40_1$ of socket 40. Plug 42 also has plug elements $42_2$ and $43_3$, which are interconnected by path $42_4$, and which mate with socket elements $40_2$ and $40_3$ as in the case of FIG. 1. Plug 42 of FIG. 2 further includes a plug element $42_5$, which mates with socket element $40_4$, and which, when mated, connects conditioner 22 output path $22o2$ to conductor $44_2$. The advantage of the arrangement of FIG. 2 is that it is not necessary to interconnect one of the conditioner 22 output conductors $223o1$ and $23o2$ to the neutral of the alternating-voltage power mains 14.

The arrangement of the disclosure does not require an active switch and a control circuit to disconnect the primary when the appliance is removed from the charger. It also disconnects the primary winding from the power mains without requiring operation of a separate switch, as the switching function is "built into" the socket-and-charger arrangement so that disconnecting the appliance from the charger also performs the switching function.

Other embodiments of the disclosure will be apparent to those skilled in the art. For example, while the description uses socket elements in the "socket" 40 and plug elements in the mating "plug" 42, socket elements may be used in the "plug" and plug elements in the "socket."

A plug-and-socket arrangement connects a portable appliance to a mains-powered battery charger/power supply. To avoid unwanted power consumption while the appliance is not connected, the plug-and-socket arrangement, when unplugged so that the appliance can be made portable, disconnects the mains power from the battery charger/power supply.

A mains-powered voltage adapter/charger (8) is for powering or charging an appliance (46) defining electrodes ($46a$, $46b$) by which power or charging current may be applied. The adaptor/charger (8) comprises a housing ($10h$) and a transformer (16) located within the housing (10h). The transformer (16) includes a secondary winding (16s) and a primary winding (16p). The primary winding defines first and second electrodes (16p1, 16p2), for generating transformed voltage at the secondary winding (16s) when mains (14) power is applied to the first (16p1) and second (16p2) electrodes of the primary winding (16). A voltage conditioner (19) is located within the housing (10h) and is electrically coupled to the secondary winding (16s), for generating conditioned voltage in response to the transformed voltage. A mating socket-and-plug arrangement (40,42) includes at least first ($40_1$, $42_1$), second ($40_2$, $42_2$) and third ($40_3$, $42_3$) mating contact sets. The socket (40) of the socket-and-plug arrangement (40, 42) is affixed to the housing (10h) so that the mating plug (42) can be mated and demated therewith. The first contact ($40_1$) of the socket (40) of the socket-and-plug arrangement (40, 42) is connected to the voltage conditioner (19) for receiving the conditioned voltage when the voltage conditioner (19) is supplied with the transformed voltage. The second contact ($40_2$) of the socket (40) is connected through the housing (10h) to the second electrode (16p2) of the primary winding (16), and the third contact ($40_3$) of the socket is connected to a mains electrode ($10i2$, $34_2$) of the housing (10h) by a conductive path (36) extending at least partially through the housing (10h). A conductor ($42_4$) interconnects the second ($42_2$) and third ($42_3$) contacts of the plug (42) of the plug-and-socket arrangement (40, 42). A conductor ($44_1$) extends from the first contact ($42_1$) of the plug (42) to one (46a) of the electrodes (46a, 46b) of the appliance (46), whereby, (a) when the socket (40) and plug (42) are mated, and mains (14) power is applied between the first electrode (16p1) of the primary winding (16p) of the transformer (16) and the mains electrode ($10i2$, $34_2$) of the housing (10h), conditioned voltage is applied to the appliance (46), and (b) when mains (14) power is applied between the first electrode (16p1) of the primary winding (16p) of the transformer (16) and the mains electrode ($10i2$, $34_2$) of the housing (10h) and the socket (40) and plug (42) are demated, the appliance (46) is rendered independent of the housing (10h) and the primary winding (16p) of the transformer (16) is decoupled from the mains (14).

An energizing arrangement (8) according to an aspect of the disclosure is for electrically energizing, from power mains (14), a portable or at least removable electrical appliance (46). The portable appliance may include a battery (48) that can be charged when the appliance (46) is connected to the energizing arrangement. The appliance (46) includes first (46a) and second (46b) electrodes by which direct current may be applied for energization, and in this context "direct current" includes direct voltage, as known to those skilled in the art. The energizing arrangement (8) comprises one (40) of a socket (40; 42) and a plug (42; 40). The one (40) of a socket (40; 42) and a plug (42; 40) includes first ($40_1$), second ($40_2$), and third ($40_3$) mutually isolated contacts. The other one (42) of a socket and a plug (42; 40) is adapted for physical mating with the one (40) of a socket and a plug (40, 42). The other one (42) of a socket and a plug (42; 40) includes first ($42_1$), second ($42_2$), and third ($42_3$) contacts. The first contact ($42_1$) of the other one (42) of the socket and plug (40; 42) is isolated from the second ($42_2$) and third ($42_3$) contacts of the one (42) of the socket and plug (40; 42). The third contact ($42_3$) of the other one (42) of the socket and plug (42; 40) is electrically common with the second contact ($42_2$) of the other one (42) of the socket and plug (42; 40), and, when the one (40) of the socket and plug (40; 42) is mated with the other one (42) of the socket and plug (42; 40), the first contact ($40_1$) of the one (40) of the socket and plug (40; 42) is connected to the first contact ($42_1$) of the other one (42) of the socket and plug (42; 40), the second contact ($40_2$) of the one (40) of a socket and plug (40; 42) is connected to the second contact ($42_2$) of the other one (42) of the socket and plug (40; 42), and the second ($42_2$) and third ($42_3$) contacts of the other one (42) of the socket and plug (40; 42) are connected to the third ($40_3$) contact of the one (40) of the socket and plug (40; 42). The energizing arrangement (8) includes an energizing or charging current converter, or "charger" (10), which may perform voltage or current regulation, or both as in the case of a foldback regulator. The charger (10) includes first ($10i_1$), second ($10i_2$), third ($10i_3$), and fourth ($22o1$) electrodes. The third electrode ($10i3$) is electrically connected to the transformer electrode (16p2) and the conditioner electrode ($22o2$). The charger (10) is energized when its second ($10i2$) and third ($10i3$) electrodes are connected and mains power is applied to the first ($10i_1$) and third ($10i_3$) electrodes of the charger, and when so energized, the charger produces energizing potential between the fourth ($22o1$) and third ($10i_3$) electrodes of the charger (10). A first electrical conductor (36) is connected to the third contact ($40_3$) of the one (40) of a socket and plug (40, 42) and is adapted to be connected to the power mains (14). A second electrical conductor ($13_1$, $34_1$) is connected to the first electrode ($10i_1$) of the charger (10) and is adapted to be connected to the of the power mains (14). A third electrical conductor ($23o1$) is connected to the fourth electrode ($22o1$) of the charger (10) and to the first contact ($40_1$) of the one (40) of the socket and plug (40; 42). A fourth electrical conductor ($44_1$) is connected to the first contact ($42_1$) of the other one (42) of the socket and plug (40, 42) and to the first electrode (46a) of the appliance (46). A fifth electrical conductor ($44_2$) is connected to at least one of the second ($42_2$) and third ($42_3$) contacts of the other one (42) of the socket and plug (40; 42) and to the second electrode (46b) of the appliance (46). A sixth electrical conductor (17) is connected to the third electrode ($10i3$) of the charger (10) and to the second contact ($40_2$) of the one (40) of the socket and plug (40; 42). A seventh electrical conductor ($42_4$) connects the second and third contacts of the other one of the socket and plug. As a result, when the socket (40) and plug (42) are mated the second ($10i2$) and third ($10i3$) electrodes of the charger are connected and the charger (10) is energized, the first contact ($42_1$) of the other one (42) of the socket and plug (40; 42) is electrically connected ($44_1$) to the first direct-current electrode (46a) of the appliance (46), and at least one of the second ($42_2$) and third ($42_3$) contacts of the other one (42) of the socket and plug (40; 42) is electrically connected ($44_2$) to the second (46b) direct-current electrode of the appliance (46), and the charger applies energizing or charging voltage to the appliance (46). When the other one (42) of the socket and plug (40; 42) is not mated with the one (40) of the socket and plug (40; 42), the second and third electrodes of the charger are disconnected and the charger (10) draws no current from the mains (14).

A charger or power source (8) according to an aspect of the disclosure is for use with an appliance (46), where the appliance (46) is energized or charged by application of conditioned voltage across first (46a) and second (46b) electrodes. The charger or power source comprises a housing (10) containing a transformer (16). The transformer (16) includes a primary winding (16p) defining first (16p1) and second (16p2) electrodes, for generating secondary power when the first (16p1) and second (16p2) electrodes of the transformer (16) are energized from alternating-current power mains (14). The housing (10) also includes at least one contact ($34_2$, $10i2$) adapted to be connected to one side (N) of the power mains (14). The housing also includes a socket (40) of a plug-and-socket arrangement (40, 42). The socket (40) includes at least first ($40_1$), second ($40_2$), and third ($40_3$) contacts. The second ($40_2$) contact of the socket (40) is connected (17) to the second electrode (16$p2$) of the primary winding (16$p$) of the transformer (16), the third contact ($40_3$) of the socket (40) is connected (36) to the one contact ($34_2$, 10$i2$) of the housing (10) whereby, when the one contact is connected to the one side (N) of the power mains (14) and the first (16$p1$) electrode of the primary winding (16$p1$) of the transformer (16) is connected to the other side (H) of the power mains (14), the one side (N) of the power mains is also connected to the third contact ($40_3$) of the socket (40) and the transformer (16) is energized. The housing (10) also containing a power conditioner (20, 22) coupled to a secondary winding (16$s$) of the transformer (16), for, when the transformer (16) is energized, generating the conditioned voltage and applying the conditioned voltage to the first contact ($40_1$) of the socket (40). The charger or power source (8) also includes a plug (42) of the plug-and-socket arrangement (40, 42). The plug (42) includes at least first ($42_1$), second ($42_2$), and third ($42_3$) contacts, which first ($42_1$), second ($42_2$), and third ($42_3$) contacts mate with the first ($40_1$), second ($40_2$), and third ($40_3$) contacts of the socket (40), respectively, when the plug-and-socket are mated. The first ($42_1$) contact of the plug (42) is connected to the first electrode (46$a$) of the appliance (46). The second ($42_2$) contact of the plug (42) is connected ($42_4$) to the third ($42_3$) contact of the plug (42), whereby, when the socket (40) and plug (42) are mated, the one side (N) of the power mains (14) is connected to the second electrode (16$p2$) of the primary winding (16$p$) of the transformer (16), for generating and applying the conditioned voltage to the appliance (46). In one embodiment of this disclosure, the conditioner (20, 22) generates the conditioned voltage between the first ($40_1$) and second ($40_2$) contacts of the socket (42), and the second contact ($42_2$) of the plug (42) is connected ($44_2$) to the second (46$b$) electrode of the appliance (46). In another embodiment of the disclosure, the socket (40) comprises a fourth contact ($40_4$), the plug (42) comprises a mating fourth contact ($42_5$), the conditioner (20, 22) generates the conditioned voltage between the first ($40_1$) and fourth ($40_4$) contacts of the socket (42), and the fourth contact ($42_5$) of the plug (42) is connected ($44_2$) to the second (46$b$) electrode of the appliance (46).

An energizing arrangement (8) according to an aspect of the disclosure is for electrically energizing, from power mains (14), a portable or at least removable electrical appliance (46). The portable appliance may include a battery (48) that can be charged when the appliance (46) is connected to the energizing arrangement. The appliance (46) includes first (46$a$) and second (46$b$) electrodes by which direct current may be applied for energization, and in this context "direct current" includes direct voltage, as known to those skilled in the art. The energizing arrangement (8) comprises one (40) of a socket (40; 42) and a plug (42; 40). The one (40) of a socket (40; 42) and a plug (42; 40) includes first ($40_1$), second ($40_2$), and third ($40_3$) mutually isolated contacts. The other one (42) of a socket and a plug (42; 40) is adapted for physical mating with the one (40) of a socket and a plug (40, 42). The other one (42) of a socket and a plug (42; 40) includes first ($42_1$), second ($42_2$), and third ($42_3$) contacts. The first contact ($42_1$) of the other one (42) of the socket and plug (40; 42) is isolated from the second ($42_2$) and third ($42_3$) contacts of the one (42) of the socket and plug (40; 42). The third contact ($42_3$) of the other one (42) of the socket and plug (42; 40) is electrically common with the second contact ($42_2$) of the other one (42) of the socket and plug (42; 40), and, when the one (40) of the socket and plug (40; 42) is mated with the other one (42) of the socket and plug (42; 40), the first contact ($40_1$) of the one (40) of the socket and plug (40; 42) is connected to the first contact ($42_1$) of the other one (42) of the socket and plug (42; 40), the second contact ($40_2$) of the one (40) of a socket and plug (40; 42) is connected to the second contact ($42_2$) of the other one (42) of the socket and plug (40; 42), and the second ($42_2$) and third ($42_3$) contacts of the other one (42) of the socket and plug (40; 42) are connected to the third ($40_3$) contact of the one (40) of the socket and plug (40; 42). The energizing arrangement (8) includes an energizing or charging current converter (10), which may perform voltage or current regulation, or both as in the case of a foldback regulator. The converter (10) includes first ($10i_1$), second ($10i_2$), third ($10i_3$), and fourth ($22o1$) electrodes. The third electrode ($10i3$) is electrically connected to the transformer electrode (16$p2$) and the conditioner electrode ($22o2$). The converter (10) is energized when its second ($10i2$) and third ($10i3$) electrodes are connected and mains power is applied to the first ($10i_1$) and third ($10i_3$) electrodes of the converter, and when so energized, the converter produces energizing potential between the fourth ($22o1$) and third ($10i_3$) electrodes of the converter (10). A first electrical conductor (36) is connected to the third contact ($40_3$) of the one (40) of a socket and plug (40, 42) and is adapted to be connected to the power mains (14). A second electrical conductor ($13_1$, $34_1$) is connected to the first electrode ($10i_1$) of the converter (10) and is adapted to be connected to the of the power mains (14). A third electrical conductor ($23o1$) is connected to the fourth electrode ($22o1$) of the converter (10) and to the first contact ($40_1$) of the one (40) of the socket and plug (40; 42). A fourth electrical conductor ($44_1$) is connected to the first contact ($42_1$) of the other one (42) of the socket and plug (40, 42) and to the first electrode (46$a$) of the appliance (46). A fifth electrical conductor ($44_2$) is connected to at least one of the second ($42_2$) and third ($42_3$) contacts of the other one (42) of the socket and plug (40; 42) and to the second electrode (46$b$) of the appliance (46). A sixth electrical conductor (17) is connected to the third electrode ($10i3$) of the converter (10) and to the second contact ($40_2$) of the one (40) of the socket and plug (40; 42). As a result, when the socket (40) and plug (42) are mated the second ($10i2$) and third ($10i3$) electrodes of the converter are connected and the converter (10) is energized, the first contact ($42_1$) of the other one (42) of the socket and plug (40; 42) is electrically connected ($44_1$) to the first direct-current electrode (46$a$) of the appliance (46), and at least one of the second ($42_2$) and third ($42_3$) contacts of the other one (42) of the socket and plug (40; 42) is electrically connected ($44_2$) to the second (46$b$) direct-current electrode of the appliance (46). The converter applies energizing or charging voltage to the appliance (46), and when the other one (42) of the socket and plug (40; 42) is not mated with the one (40) of the socket and plug (40; 42) the converter (10) draws no current from the mains (14).

An energizing arrangement (8) according to another aspect of the disclosure is for electrically energizing from power mains (14) a removable electrical appliance (46), where the appliance (46) has first (46$a$) and second (46$b$) electrodes by which direct current may be applied for energization. The energization may result in the charging of a battery of the appliance. The energizing arrangement (8) comprises one (40) of a socket (40; 42) and a plug (42; 40). The one (40) of a socket (40; 42) and a plug (42; 40) includes first ($40_1$), second ($40_2$), third ($40_3$), and fourth ($40_4$) mutually isolated contacts. The other one (42) of a socket and a plug (42; 40) is adapted for physical mating with the one (40) of a socket and a plug (40, 42). The other one (42) of a socket and a plug (42; 40) includes first ($42_1$), second ($42_2$), third ($42_3$), and fourth ($42_5$) contacts. The third contact ($42_3$) of the other one (42) of the socket and plug (42; 40) is electrically common with the second contact ($42_2$) of the other one (42) of the socket and plug ($42$; $40$), and, when the one ($40$) of the socket and plug ($40$; $42$) is mated with the other one ($42$) of the socket and plug ($42$; $40$), the first contact ($40_1$) of the one ($40$) of the socket and plug ($40$; $42$) is connected to the first contact ($42_1$) of the other one ($42$) of the socket and plug ($42$; $40$), the second contact ($40_2$) of the one ($40$) of a socket and plug ($40$; $42$) is connected to the second contact ($42_2$) of the other one ($42$) of the socket and plug ($40$; $42$), the second ($42_2$) and third ($42_3$) contacts of the other one ($42$) of the socket and plug ($40$; $42$) are connected to the second ($40_2$) and third ($40_3$) contacts of the one ($40$) of the socket and plug ($40$; $42$), and the fourth ($40_4$) contact of the one ($40$) of the socket and plug ($40$, $42$) is connected to the fourth ($42_5$) contact of the other one ($42$) of the socket and plug ($40$; $42$). A converter ($10$) includes first ($10i_1$), second ($10i_2$), third ($10i_3$), fourth ($22o1$), and fifth ($22o2$) electrodes. The converter ($10$) is energized when mains power is applied to the first ($10i_1$) and third ($10i_3$) electrodes of the converter, and when so energized, produces energizing potential between the fourth ($22o1$) and fifth ($22o2$) electrodes of the converter ($10$). A first electrical conductor ($36$) is connected to the third contact ($40_3$) of the one ($40$) of a socket and plug ($40$, $42$) and is adapted to be connected to the power mains ($14$). A second electrical conductor ($13_1$, $34_1$) is connected to the first electrode ($10i_1$) of the converter ($10$) and is adapted to be connected to the power mains ($14$). A third electrical conductor ($23o1$) is connected to the fourth electrode ($22o1$) of the converter ($10$) and to the first contact ($40_1$) of the one ($40$) of the socket and plug ($40$; $42$). A fourth electrical conductor ($23o2$) is connected to the fifth electrode ($22o2$) of the converter ($10$) and to the fourth contact ($40_4$) of the one ($40$) of the socket and plug ($40$; $42$). A fifth electrical conductor ($44_1$) is connected to the first contact ($42_1$) of the other one ($42$) of the socket and plug ($40$, $42$) and to the first electrode ($46a$) of the appliance ($46$). A sixth electrical conductor ($44_2$) is connected to at the fourth ($42_5$) contact of the other one ($42$) of the socket and plug ($40$; $42$) and to the second electrode ($46b$) of the appliance ($46$). A seventh electrical conductor ($17$) is connected to the third electrode ($10i_3$) of the converter ($10$) and to the second contact ($40_2$) of the one ($40$) of the socket and plug ($40$, $42$), whereby, when the socket ($40$) and plug ($42$) are mated the second ($10i_2$) and third ($10i_3$) electrodes of the converter are connected and the converter ($10$) is energized, the first contact ($42_1$) of the other one ($42$) of the socket and plug ($40$; $42$) is electrically connected ($44_1$) to the first direct-current electrode ($46a$) of the appliance ($46$), and the fourth ($42_5$) contact of the other one ($42$) of the socket and plug ($40$; $42$) is electrically connected ($44_2$) to the second ($46b$) direct-current electrode of the appliance ($46$), and the converter ($10$) applies energizing voltage to the appliance ($46$). When the other one ($42$) of the socket and plug ($40$; $42$) is not mated with the one ($40$) of the socket and plug ($40$; $42$) the converter ($10$) draws no current from the mains ($14$).

What is claimed is:

1. A mains-powered voltage adapter/charger for powering or charging an appliance defining electrodes by which power or charging current may be applied, said adaptor/charger comprising:
   a housing;
   a transformer located within said housing, said transformer including a secondary winding and a primary winding defining first and second electrodes, for generating transformed voltage at said secondary winding when mains power is applied to said first and second electrodes of said primary winding;
   a voltage conditioner located within said housing and coupled to said secondary winding, for generating conditioned voltage in response to said transformed voltage;
   a mating socket-and-plug arrangement, said socket-and-plug arrangement including at least first, second and third mating contact sets, said socket of said socket-and-plug arrangement being affixed to said housing so that the mating plug can be mated and demated therewith, said first contact of said socket of said socket-and-plug arrangement being connected to said voltage conditioner for, when said voltage conditioner is supplied with said transformed voltage, receiving said conditioned voltage, said second contact of said socket being connected through said housing to said second electrode of said primary winding, said third contact of said socket being connected to a mains electrode of said housing by a conductive path extending at least partially through said housing;
   a conductor interconnecting said second and third contacts of said plug of said plug-and-socket arrangement, and a conductor extending from said first contact of said plug to one of said electrodes of said appliance, whereby, (a) when said socket and plug are mated, and mains power is applied between said first electrode of said primary winding of said transformer and said mains electrode of said housing, conditioned voltage is applied to said appliance, and (b) when mains power is applied between said first electrode of said primary winding of said transformer and said mains electrode of said housing and said socket and plug are demated, said appliance is rendered independent of said housing and said primary winding of said transformer is decoupled from said mains.

2. An energizing arrangement for electrically energizing from power mains a removable electrical appliance, where said appliance includes first and second electrodes by which direct current may be applied for energization, said energizing arrangement comprising:
   one of a socket and a plug, said one of a socket and a plug including first, second, and third mutually isolated contacts;
   the other one of a socket and a plug, said other one of a socket and a plug being adapted for physical mating with said one of a socket and a plug, said other one of a socket and a plug including first, second, and third contacts, said third contact of said other one of said socket and plug being electrically common with said second contact of said other one of said socket and plug, and, when said one of said socket and plug is mated with said other one of said socket and plug, said first contact of said one of said socket and plug being connected to said first contact of said other one of said socket and plug, said second contact of said one of a socket and plug being connected to said second contact of said other one of said socket and plug, and said third contact of said other one of said socket and plug being connected to said third contacts of said one of said socket and plug;
   a voltage or current converter including first, second, third, and fourth electrodes, said converter being energized when mains power is applied to said first and third electrodes of said converter, and when so energized, producing energizing potential between said fourth and third electrodes of said converter;
   a first electrical conductor connected to said third contact of said one of a socket and plug and adapted to be connected to said power mains;

a second electrical conductor connected to said first electrode of said converter and adapted to be connected to said power mains;

a third electrical conductor connected to said second electrode of said converter and to said first contact of said one of said socket and plug;

a fourth electrical conductor connected to said first contact of said other one of said socket and plug and to said first electrode of said appliance;

a fifth electrical conductor connected to at least one of said second and third contacts of said other one of said socket and plug and to said second electrode of said appliance;

a sixth electrical conductor connected to said third electrode of said converter and to said second contact of said one of said socket and plug, whereby, when said socket and plug are mated said second electrode and said third electrode of said converter are connected and said converter is energized, said first contact of said other one of said socket and plug is electrically connected to said first direct-current electrode of said appliance, and at least one of said second and third contacts of said other one of said socket and plug is electrically connected to said second direct-current electrode of said appliance, said converter applies energizing voltage to said appliance, and when said other one of said socket and plug is not mated with said one of said socket and plug said converter draws no current from said mains.

3. An energizing arrangement according to claim 2, wherein said power mains define hot and neutral sides, said first electrical conductor is adapted to be connected to said neutral side of said power mains, and said second electrical conductor is adapted to be connected to said hot side of said power mains.

4. An energizing arrangement according to claim 2, wherein said appliance comprises a battery for energizing said appliance when removed from said energizing arrangement, and said first and second direct-current electrodes are ultimately connected to said battery.

5. An energizing arrangement for electrically energizing from power mains a removable electrical appliance, where said appliance includes first and second electrodes by which direct current may be applied for energization, said energizing arrangement comprising:

One of a socket and a plug, said one of a socket and a plug including first, second, third, and fourth mutually isolated contacts;

the other one of a socket and a plug, said other one of a socket and a plug being adapted for physical mating with said one of a socket and a plug, said other one of a socket and a plug including first, second, third, and fourth contacts, said third contact of said other one of said socket and plug being electrically common with said second contact of said other one of said socket and plug, and, when said one of said socket and plug is mated with said other one of said socket and plug, said first contact of said one of said socket and plug being connected to said first contact of said other one of said socket and plug, said second contact of said one of a socket and plug being connected to said second contact of said other one of said socket and plug, said second and third contacts of said other one of said socket and plug being connected to said second and said third contacts of said one of said socket and plug, and said fourth contact of said one of said socket and plug being connected to said fourth contact of said other one of said socket and plug;

a current converter including first, second, third, fourth, and fifth electrodes, said converter being energized when mains power is applied to said first and third electrodes of said converter, and when so energized, producing energizing potential between said fourth and fifth electrodes of said converter;

a first electrical conductor connected to said third contact of said one of a socket and plug and adapted to be connected to said power mains;

a second electrical conductor connected to said first electrode of said converter, and adapted to be connected to said power mains;

a third electrical conductor connected to said fourth electrode of said converter and to said first contact of said one of said socket and plug;

a fourth electrical conductor connected to said fifth electrode of said converter and to said fourth contact of said one of said socket and plug;

a fifth electrical conductor connected to said first contact of said other one of said socket and plug and to said first electrode of said appliance;

a sixth electrical conductor connected to at said fourth contact of said other one of said socket and plug and to said second electrode of said appliance;

a seventh electrical conductor connected to said third electrode of said converter and to said second contact of said one of said socket and plug, whereby, when said socket and plug are mated said second electrode and said third electrode of said converter are connected and said converter is energized, said first contact of said other one of said socket and plug is electrically connected to said first direct-current electrode of said appliance, and said fourth contact of said other one of said socket and plug is electrically connected to said second direct-current electrode of said appliance, said converter applies energizing voltage to said appliance, and when said other one of said socket and plug is not mated with said one of said socket and plug said converter draws no current from said mains.

6. A charger or power source for an appliance, which appliance is energized or charged by application of conditioned voltage across first and second electrodes, said charger or power source comprising:

a housing containing a transformer, said transformer including a primary winding defining first and second electrodes, for generating secondary power when said first and second electrodes of said transformer are energized from alternating-current power mains, said housing also including at least one contact adapted to be connected to one side of said power mains, said housing also including a socket of a plug-and-socket arrangement, said socket also including at least first, second, and third contacts, said second contact of said socket being connected to said second electrode of said primary winding of said transformer, said third contact of said socket being connected to said one contact of said housing whereby, when said one contact is connected to said one side of said power mains and said first electrode of said primary winding of said transformer is connected to the other side of said power mains, said one side of said power mains is also connected to said third contact of said socket and said transformer is energized, said housing also containing a power conditioner coupled to a secondary winding of said transformer, for, when said transformer is energized, generating said conditioned voltage and applying said conditioned voltage to said first contact of said socket;

a plug of said plug-and-socket arrangement, said plug also including at least first, second, and third contacts, which first, second, and third contacts mate with said first, second, and third contacts of said socket, respectively, when said plug-and-socket are mated, said first contact of said plug being connected to said first electrode of said appliance, said second contact of said plug being connected to said third contact of said plug, whereby, when said socket and plug are mated, said one side of said power mains is connected to said second electrode of said primary winding of said transformer, for generating and applying said conditioned voltage to said appliance.

7. A source according to claim 6, wherein:
said conditioner generates said conditioned voltage between said first and second contacts of said socket; and
said second contact of said plug is connected to said second electrode of said appliance.

8. A source according to claim 6, wherein:
said socket comprises a fourth contact and said plug comprises a mating fourth contact;
said conditioner generates said conditioned voltage between said first and fourth contacts of said socket; and
said fourth contact of said plug is connected to said second electrode of said appliance.

9. A mains-powered converter including:
a housing enclosing a transformer including a primary and secondary winding, which transformer when energized by application of power mains voltage to said primary winding, generates transformed power at its secondary winding, said housing also enclosing a voltage conditioner coupled to said secondary winding for generating conditioned power in response to said transformed power, said housing also supporting a socket of a mating set of socket and plug, where said socket includes first, second, and third contacts, and an electrical connection between said voltage conditioner and at least said first contact of said socket, said housing further enclosing a first conductor extending from said second contact of said socket to a second electrode of said primary winding, and a second conductor extending from said third contact of said socket to a mains contact;
said plug including a first contact adapted, when said plug is mated to said socket to connect with said first contact of said socket and to couple said conditioned voltage to said appliance, a second contact adapted to connect with said second contact of said socket, and a third contact adapted to connect with said third contact of said socket, said plug including a connection between said second and third contacts, whereby, when said plug and said socket are mated, said mains contact is connected to said second electrode of said primary winding;
one side of said mains being adapted to be connected to one side of said primary winding and the other side of said mains being adapted to be connected to said mains contact, whereby, when said mains connections are made and said plug and socket are mated, said conditioned voltage is applied to said appliance, and when said socket and plug are unmated, said mains power is decoupled from said primary winding of said transformer.

* * * * *